(12) United States Patent
Guo et al.

(10) Patent No.: US 7,288,853 B1
(45) Date of Patent: Oct. 30, 2007

(54) POWER CONTROL CENTER WITH SOLID STATE DEVICE FOR CONTROLLING POWER TRANSMISSION

(75) Inventors: Sam Y Guo, Canton, MI (US); Kenneth J Russel, South Lyon, MI (US); Alexander Shoshiev, Beverly Hills, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/590,590

(22) Filed: Oct. 31, 2006

Related U.S. Application Data

(63) Continuation-in-part of application No. 11/120,865, filed on May 3, 2005, now Pat. No. 7,268,446.

(60) Provisional application No. 60/606,295, filed on Sep. 1, 2004.

(51) Int. Cl.
- *B60L 1/00* (2006.01)
- *H01H 35/00* (2006.01)
- *H02M 1/00* (2006.01)
- *H01R 31/08* (2006.01)

(52) U.S. Cl. ............. 307/10.1; 307/126; 363/144

(58) Field of Classification Search ........ 363/144–147; 439/194, 511, 529, 530, 620.01, 620.15, 620.21; 307/9.1, 10.1, 125, 126, 130, 140, 141.4, 307/142, 143; 200/237, 238, 284, 303
See application file for complete search history.

(56) References Cited

U.S. PATENT DOCUMENTS

| | | |
|---|---|---|
| 4,872,089 A | 10/1989 | Ocken et al. |
| 5,130,888 A | 7/1992 | Moore |
| 5,144,282 A | 9/1992 | Sutterlin et al. |
| 5,235,317 A | 8/1993 | Sutterlin et al. |
| 5,613,598 A * | 3/1997 | Pittman et al. ............. 200/295 |
| 5,747,877 A | 5/1998 | Wilson |
| 5,844,761 A | 12/1998 | Place, IV |
| 5,892,426 A * | 4/1999 | Huang ..................... 337/59 |
| 6,055,149 A | 4/2000 | Gillberg et al. |
| 6,111,758 A | 8/2000 | Dowd |
| 6,476,481 B2 | 11/2002 | Woodworth et al. |
| 6,525,639 B1 * | 2/2003 | Cheng ..................... 337/37 |
| 6,583,973 B1 | 6/2003 | Pärn |
| 6,693,370 B2 * | 2/2004 | Yamane et al. ............ 307/10.1 |
| 6,751,080 B2 | 6/2004 | Yamaji |
| 6,984,141 B1 * | 1/2006 | Beski et al. ................ 439/188 |
| 7,006,355 B2 * | 2/2006 | Wakabayashi et al. ...... 361/728 |
| 7,189,108 B2 * | 3/2007 | Takaya et al. .............. 439/511 |

* cited by examiner

*Primary Examiner*—Matthew V. Nguyen
(74) *Attorney, Agent, or Firm*—Harness, Dickey & Pierce, P.L.C.

(57) ABSTRACT

A semiconductor device for an automotive power control center. The device can include first, second and third legs, a semiconductor and an insulating material. The semiconductor is coupled to the legs and configured to transmit relatively high current power between the first and second legs in response to a control signal transmitted via the third leg. The insulating material can encapsulate the semiconductor and portions of the first and second legs. The insulating material can pass through one or more apertures formed in each of the first and second legs to aid in structurally interlocking the first and second legs to one another. A method for forming a semiconductor device is also provided.

19 Claims, 8 Drawing Sheets

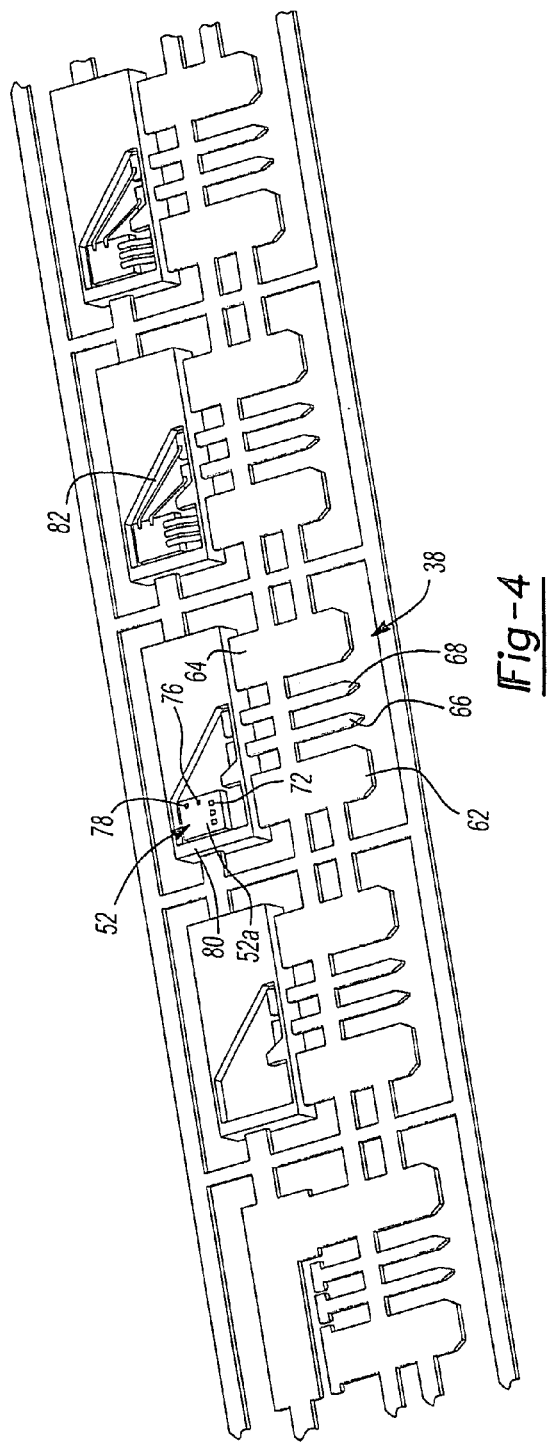
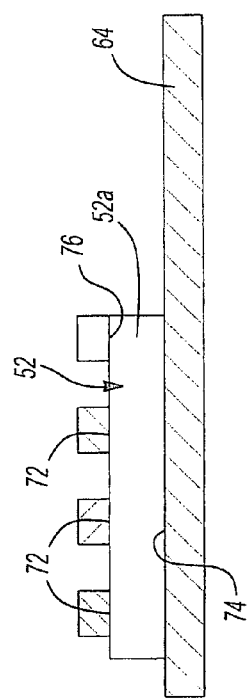

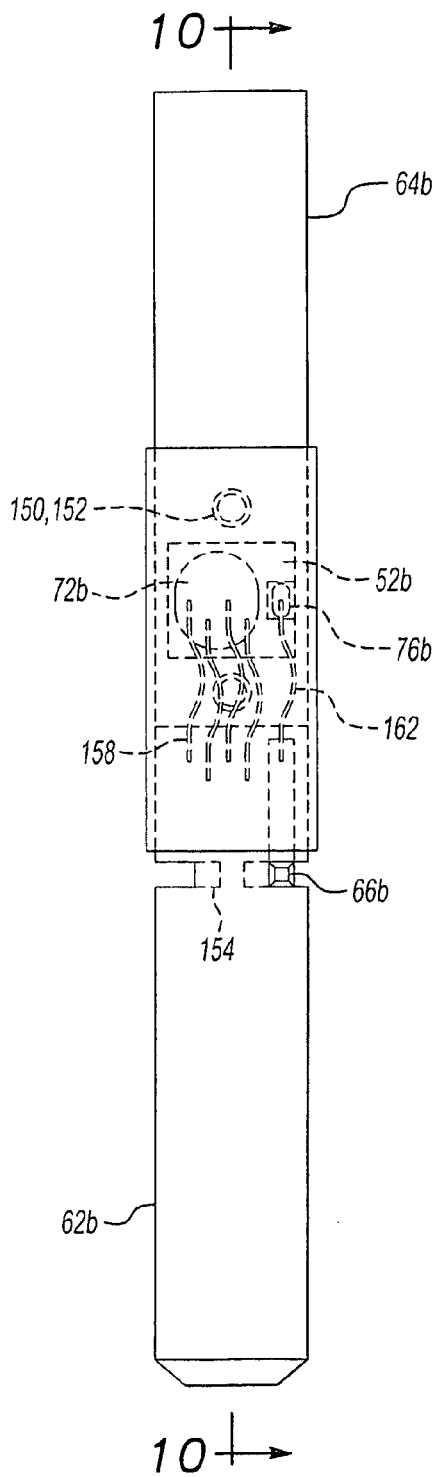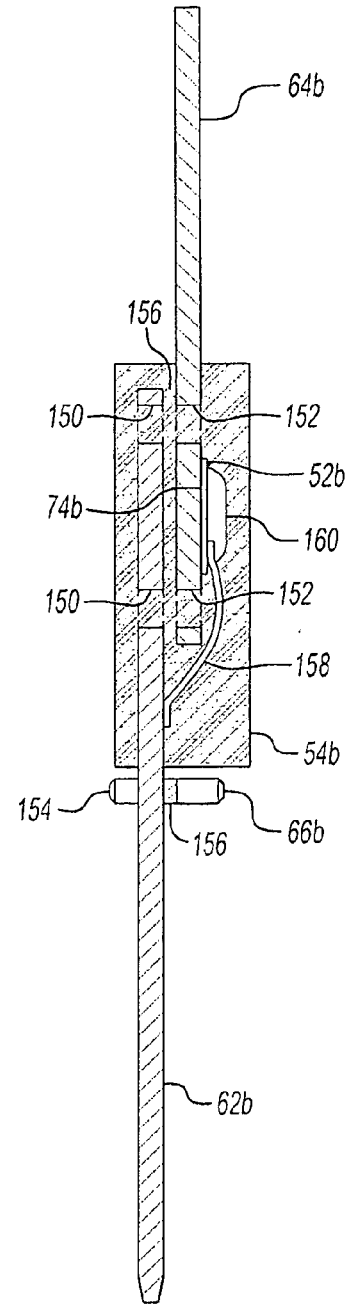
Fig-9
Fig-10

POWER CONTROL CENTER WITH SOLID STATE DEVICE FOR CONTROLLING POWER TRANSMISSION

This application is a continuation-in-part of U.S. patent application Ser. No. 11/120,865 entitled "Power Control Center With Solid State Device For Controlling Power Transmission" filed May 3, 2005 now U.S. Pat. No. 7,268,446, which claims priority to U.S. Provisional Patent Application Ser. No. 60/606,295 entitled "Power Control Center With Solid State Device For Controlling Power Transmission" filed Sep. 1, 2004. Other features described herein are claimed in U.S. patent application Ser. No. 11/120,867 filed May 3, 2005 now U.S. Pat. No. 7,268,447. The disclosures of U.S. Provisional Patent Application Ser. No. 60/606,295 and U.S. patent application Ser. Nos. 11/120,865 and 11/120,867 are hereby incorporated by reference as if fully set forth in detail herein.

INTRODUCTION

The present disclosure generally relates power switching devices and more particularly power switching devices that integrate controls circuitry and power switching circuitry.

An automotive power control center is typically the primary power switching and protection device that is located between a primary power source, such as the positive (B+) terminal of the vehicle battery, and various vehicle electrical devices, such as window and door motors, lights and HVAC fans, which are typically coupled to the automotive power control center via a wire harness. Presently, automotive power control centers may employ conventional componentry, such as relays, flashers and fuses, or a combination of conventional componentry and solid-state devices for power switching and management. Generally speaking, solid-state devices tend to have greater long-term reliability as compared to conventional components such as relays as they do not have moving parts. Furthermore, solid-state devices are generally smaller. Consequently, it is desirable that automotive power control centers include solid-state devices.

Solid-state devices are, however, more commonly employed in relatively low current circuits (i.e., circuits where typically less than 0.5 amp of current is employed). As modern vehicles employ both high and low current circuits, traditional components, such as relays, are still widely used in automotive power control centers. In practice, low current circuitry, which is commonly mounted on a circuit board, is commonly employed to control the relays to distribute high-current power from a bus bar to another bus bar or wire harness. Configuration of the automotive power control center in this manner presents several problems, however.

For example, implementation of connections of low and high-current circuits to relays necessitates the use of multiple layers of bus bars. This approach results in increased cost and weight of the power center, as well as a commensurate increase in the complexity and cost of the tools used to produce it. It would therefore be beneficiary to employ solid-state devices to perform the switching of power.

Usage of board-mounted solid-state devices for high-power switching in the current art presents some other problems, however. In this regard, the various solid-state components often times generate significant amounts of heat and as such, a relatively large heat sink must generally be provided to dissipate the heat to a location outside the power center. In addition, the need to connect the solid-state device with primary source of power for input and with wire harness for output, typically results in employing wide and thick copper traces on the board. This results in usage of heavy-copper boards and an increase of board size and complexity. Consequently, the costs associated with the circuit board tend to be relatively high.

In view of these drawbacks, there remains a need in the art for an improved automotive power control center that utilizes solid-state devices for the control and switching of all types of current loads.

SUMMARY

In one form, the present teachings provide a solid-state device having a first leg, a second leg, a third leg and a semiconductor. The first leg is adapted to be coupled to an electrical power source and sized to carry an electrical load of at least 0.5 amp. The first leg has a section with a first surface and an opposite, second surface having through-holes. The semiconductor is electrically connected to the first surface of the section of the first leg. The second leg is adapted to be coupled to a load and sized to carry an electrical load of at least 0.5 amp. The second leg has a portion that overlaps the second surface of the section of the first leg. The overlapping portion of the second leg being separated from the second surface of the section of the first leg by a layer of electrically insulating material. The overlapping portion of the second leg having through-holes aligned with the through-holes of the section of the first leg. The third leg mounted on the second leg and being electrically insulated from the second leg and adapted to be connected to a control circuit. An electrical coupling means is employed to electrically couple the semiconductor with the second leg and with the third leg such that the semiconductor selectively controls power transmission from the first leg to the second leg in response to control signals from the third leg. An electrically insulating packaging material encapsulates the semiconductor, the section of the first leg and the overlapping portion of the second leg such that some of the packaging material filling the aligned through-holes.

In another form, the present teachings provide a method that includes: providing a first leg that is formed of an electrically conductive material, the first leg being sized to carry an electrical load of at least 0.5 amp, the first leg including a mounting portion and a first securing portion, the first securing portion having a first zone adjacent the mounting portion that defines a first coupling aperture; providing a second leg that is formed of an electrically conductive material, the second leg being sized to carry an electrical load of at least 0.5 amp, the second leg having a second securing portion with a second zone that defines a second coupling aperture; providing a third leg that is at least partially formed of a conductive material, the third leg being coupled to the first leg, the second leg or both the first and second legs such that the third leg is fixedly coupled thereto but electrically insulated therefrom; providing a semiconductor with an input terminal, an output terminal and a control terminal; electrically coupling the semiconductor to the first, second and third legs such that the input terminal is electrically coupled to the first leg, the output terminal is electrically coupled to the second leg and the control terminal is electrically coupled to the third leg; and at least partially encapsulating the semiconductor and the first and second securing portions in an electrically insulating material such that the electrically insulating material extends through the first and second coupling apertures.

In yet another form, the present teachings provide an apparatus that includes a first leg, a second leg, a third leg, a semiconductor and an insulating material. The first leg is formed of an electrically conductive material and sized to carry an electrical load of at least 0.5 amp. The first leg includes a mounting portion and a first securing portion. The first securing portion having a first zone adjacent the mounting portion that defines a first coupling aperture. The second leg is formed of an electrically conductive material and sized to carry an electrical load of at least 0.5 amp. The second leg has a second securing portion with a second zone that defines a second coupling aperture. The third leg is at least partially formed of a conductive material and coupled to the first leg, the second leg or both the first and second legs such that the third leg is fixedly coupled thereto but electrically insulated therefrom. The semiconductor includes an input terminal, which is electrically coupled to the first leg, an output terminal, which is electrically coupled to the second leg, and a control terminal that is electrically coupled to the third leg. The electrically insulative material at least partially encapsulates the semiconductor and the first and second securing portions such that the electrically insulating material extends through the first and second coupling apertures.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Additional advantages and features of the present disclosure will become apparent from the subsequent description and the appended claims, taken in conjunction with the accompanying drawings, wherein:

FIG. 4 is a perspective view of a lead frame progression illustrating one method for manufacturing a solid-state device constructed in accordance with the teachings of the present disclosure;

FIG. 5 is a sectional view taken along the line 5-5 of FIG. 3;

FIG. 9 is an enlarged view of a portion of the solid-state device of FIG. 8 prior to the formation of the insulator;

FIG. 10 is a longitudinal cross-sectional view taken through a part of the solid-state device of FIG. 8;

DETAILED DESCRIPTION OF THE VARIOUS EMBODIMENTS

Figure 1:
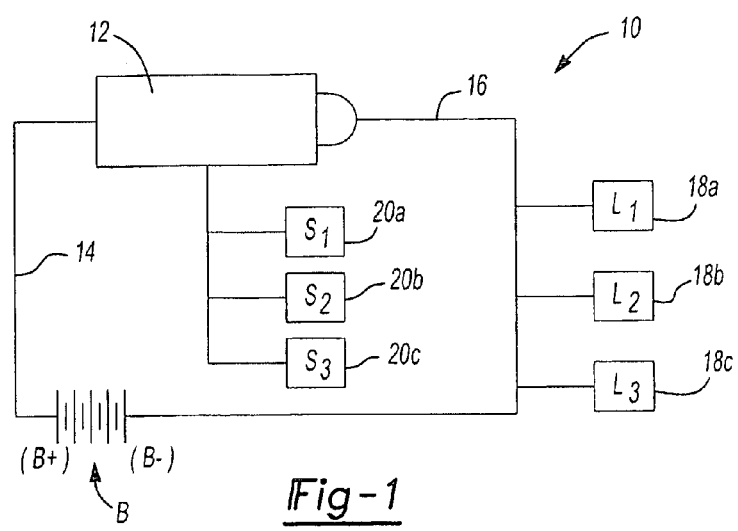
FIG. 1 is a schematic view of a vehicle having an automotive power control center constructed in accordance with the teachings of the present disclosure.

With reference to FIG. 1 of the drawings, a vehicle 10 is illustrated to include an automotive power control center 12 that is constructed in accordance with the teachings of the present disclosure. The vehicle 10 is schematically illustrated to also include a battery B, a first wire harness 14, a second wire harness 16 and a plurality of load devices 18a, 18b and 18c. The first wire harness 14 may operably couple the B+ terminal of the battery B to the power control center 12, while the second wire harness 16 may operably couple the power control center 12 to the several load devices 18a, 18b and 18c and the B-terminal of the battery B. For ease of illustration and discussion the second wire harness 16 has been illustrated as being directly coupled to the B-terminal of the battery B. Those of ordinary skill in the art will appreciate, however, that the second wire harness 16 need not be directly coupled to the B-terminal but rather may employ a tertiary conductor, such as the vehicle body (not shown), in a manner that is well known in the art. The load devices 18a, 18b and 18c may be any type of electrically-powered device and may comprise common vehicle components such as motors, solenoids, fans, refrigerant compressors, that may be selectively operated by a vehicle occupant through means such as switches 20a, 20b and 20c, respectively. Although the example provided is illustrated and described as employing a plurality of switches to selectively control the operation of one or more load devices, it will be understood that the operation of the load devices may be controlled in response to the generation of any type of signal, whether manually or automatically generated.

Figure 2:
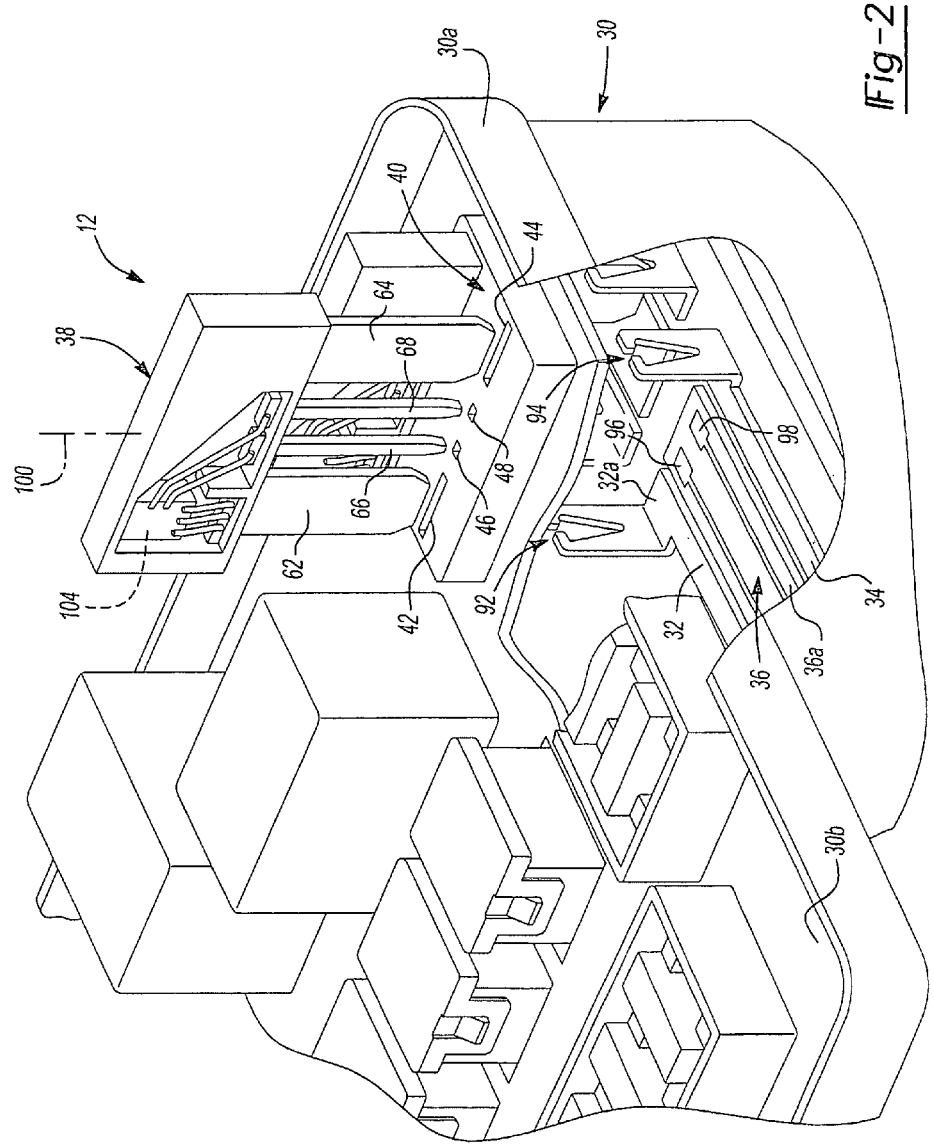
FIG. 2 is an exploded and partially broken away perspective view of a portion of the automotive power control center of FIG. 1.

In FIG. 2, the power control center 12 may include a housing 30, a first conductor 32, a second conductor 34, a control circuit 36 and a solid-state device 38. The housing 30 may include one or more housing members (e.g., 30a, 30b) and may be configured to house the first conductor 32, the second conductor 34 and/or the control circuit 36. In the particular example provided, the first conductor 32 is a bus bar 32a that is coupled to the B+ terminal (FIG. 1) of the battery B (FIG. 1) and entirely housed in the housing 30, while the second conductor 34 is electrically isolated from the first conductor 32 and may be a second bus bar or a wire harness terminal. An upper housing member 30b may define a coupling nest 40 into which the solid-state device 38 is received. More specifically, the coupling nest 40 may define a first leg aperture 42, a second leg aperture 44, a third leg aperture 46 and optionally one or more auxiliary leg apertures 48. While each of the leg apertures 42, 44, 46 and 48 is illustrated as being individually formed, it will be appreciated that in some situations, one or more of the leg apertures may be interconnected.

The control circuit 36 may be coupled to the housing 30 and is configured to receive relatively low-current signals from various components within the vehicle 10 (FIG. 1), such the switches 20a, 20b and 20c (FIG. 1). In the example provided, the control circuit 36 includes a printed circuit board 36a. but it will be appreciated that other types of control circuits may additionally or alternatively be employed.

Figure 3:
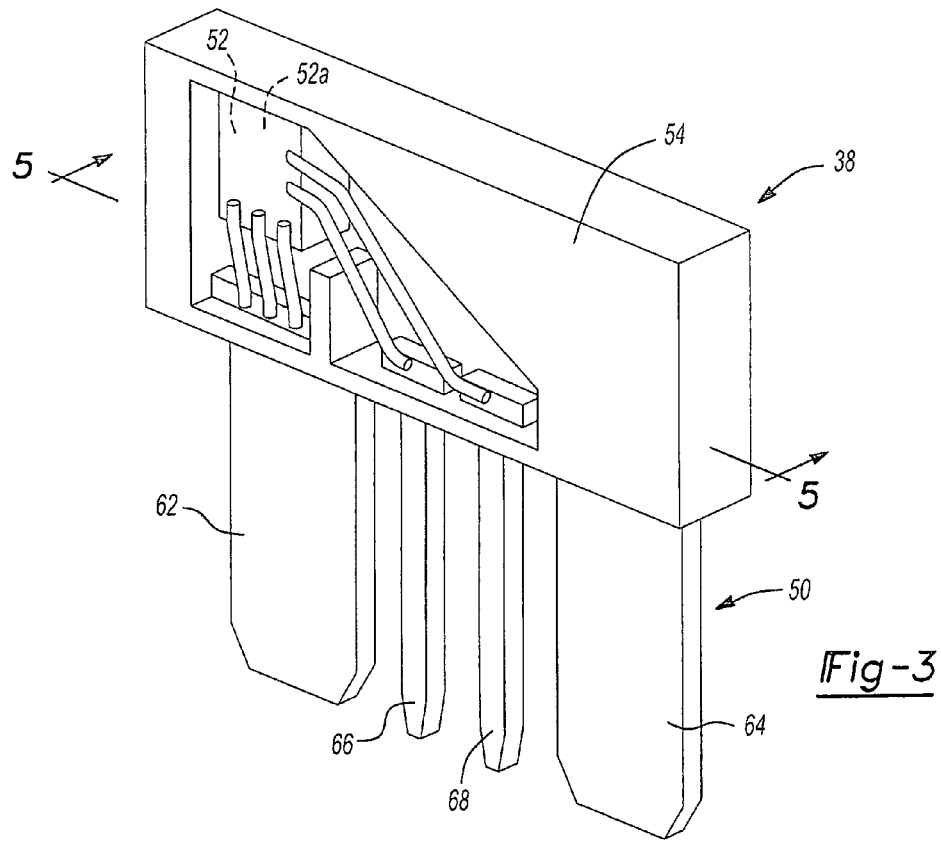
FIG. 3 is a perspective view of a portion of the automotive power control center of FIG. 1 illustrating one type of solid-state device in greater detail.

With reference to FIG. 3, the solid-state device 38 may include a lead frame 50, a semiconductor 52 and an insulator 54. The lead frame 50 defines a first leg 62, a second leg 64, a third leg 66 and optionally one or more auxiliary legs. In the example provided, the lead frame 50 defines one auxiliary leg 68. Also in the example provided, each of the first, second, third and auxiliary legs 62, 64, 66 and 68 is illustrated to be male spade terminals which are generally parallel one another. It will be appreciated, however, that other leg configurations and/or constructions may be employed in the alternative. With additional reference to FIGS. 4 and 5, the semiconductor 52, which is illustrated to comprise a single semiconductor die 52a but which could comprise a plurality of semiconductor dies, includes an input terminal 72, an output terminal 74 and a control terminal 76, which are electrically coupled to the first leg 62, second leg 64, third leg 66, respectively, through any appropriate means, such as wire bonding or direct bonding. The semiconductor 52 may also include one or more auxiliary terminals 78, each of which being coupled to an associated auxiliary leg 68.

The insulator 54 at least partially covers the semiconductor 52 and may encapsulate the semiconductor 52 and/or portions of the first leg 62, the second leg 64, the third leg 66 and/or the auxiliary leg(s) 68. In the example provided, the insulator comprises a first portion 80, which partially encapsulates the first, second, third and auxiliary legs 62, 64, 66 and 68 and a second portion 82, which is overmolded onto the first portion 80 and the semiconductor 52.

Returning to FIG. 2, the solid-state device 38 is removably coupled to the housing 30 such that the first leg 62 extends through the first leg aperture 42 and is electrically coupled to the first conductor 32, the second leg 64 extends through the second leg aperture 44 and is electrically coupled to the second conductor 34, the third leg 66 extends through the third leg aperture 46 and is electrically coupled to the control circuit 36, and each auxiliary leg 68 extends through an associated auxiliary leg aperture 48 and is electrically coupled to the control circuit 36. In the example provided, the first conductor 32 and the second conductor 34 include terminals 92 and 94, respectively, that directly engage the first and second legs 62 and 64, when the solid-state device 38 is inserted to the coupling nest 40 of the housing 30 and the control circuit 36 includes terminals 96 and 98, respectively, that directly engage the third and auxiliary legs 66 and 68, respectively, when the solid-state device 38 is inserted to the coupling nest 40 of the housing 30.

The semiconductor 52 selectively controls transmission of electricity between the first and second legs 62 and 64 at least partially in response to a signal provided by the control circuit 36 through the third leg 66. The signal provided by the control circuit 36 may be in the form of a discrete signal of a predetermined voltage, or may be an electronic message (e.g., a serially transmitted message). To facilitate removable coupling of the solid-state device 38, the distal end of the first and second legs 62 and 64, which is located opposite the insulator 54, may terminate in a common plane that is generally transverse to an insertion axis 100 along which the solid-state device 38 is inserted into the coupling nest 40.

Each optional auxiliary leg 68 may be electrically coupled to the control circuit 36 and may permit an associated auxiliary signal to be transmitted between the semiconductor 52 and the control circuit 36. In the example provided, the semiconductor 52 includes an internal temperature sensor 104 and the semiconductor 52 transmits a signal to the control circuit 36 through the auxiliary leg 68 in response to a determination that a temperature of the semiconductor 52 exceeds a predetermined temperature. It will be appreciated that other types of sensors may additionally or alternatively be incorporated into the semiconductor 52 and/or that one or more of the auxiliary legs 68 may be employed to transmit a signal from the control circuit 36 to the semiconductor 52. It will also be appreciated that the first, second, third and auxiliary legs 62, 64, 66 and 68 may be formed to any desired length. For example, relatively short legs may be employed to interface directly to mating terminals in the control circuit 36 or to the bus bar, while relatively longer terminals may be employed to connect to wire harness terminals or directly to a connector of a wire harness (i.e., thereby eliminating the need for an intermediate bus bar connection to the wire harness). Moreover, it will be appreciated that the first, second, third and auxiliary legs 62, 64, 66 and 68 may be oriented and/or sized in any desired manner. For example, if spade terminal legs are employed, they may be sized in 1.5 mm, 2.8 mm and/or 6.3 mm sizes as desired to handle the power that is transmitted therethrough.

The power control center 12 has significant advantages over prior art power control centers, including: the coupling of the semiconductor 52 to a bus bar or other relatively large conductor, which provides generally higher current transmission capabilities and better heat dissipation as compared with traces on printed circuit boards, and a relatively high degree of modularity that may be readily adapted to a wide range of vehicles and vehicle models.

Figure 6:
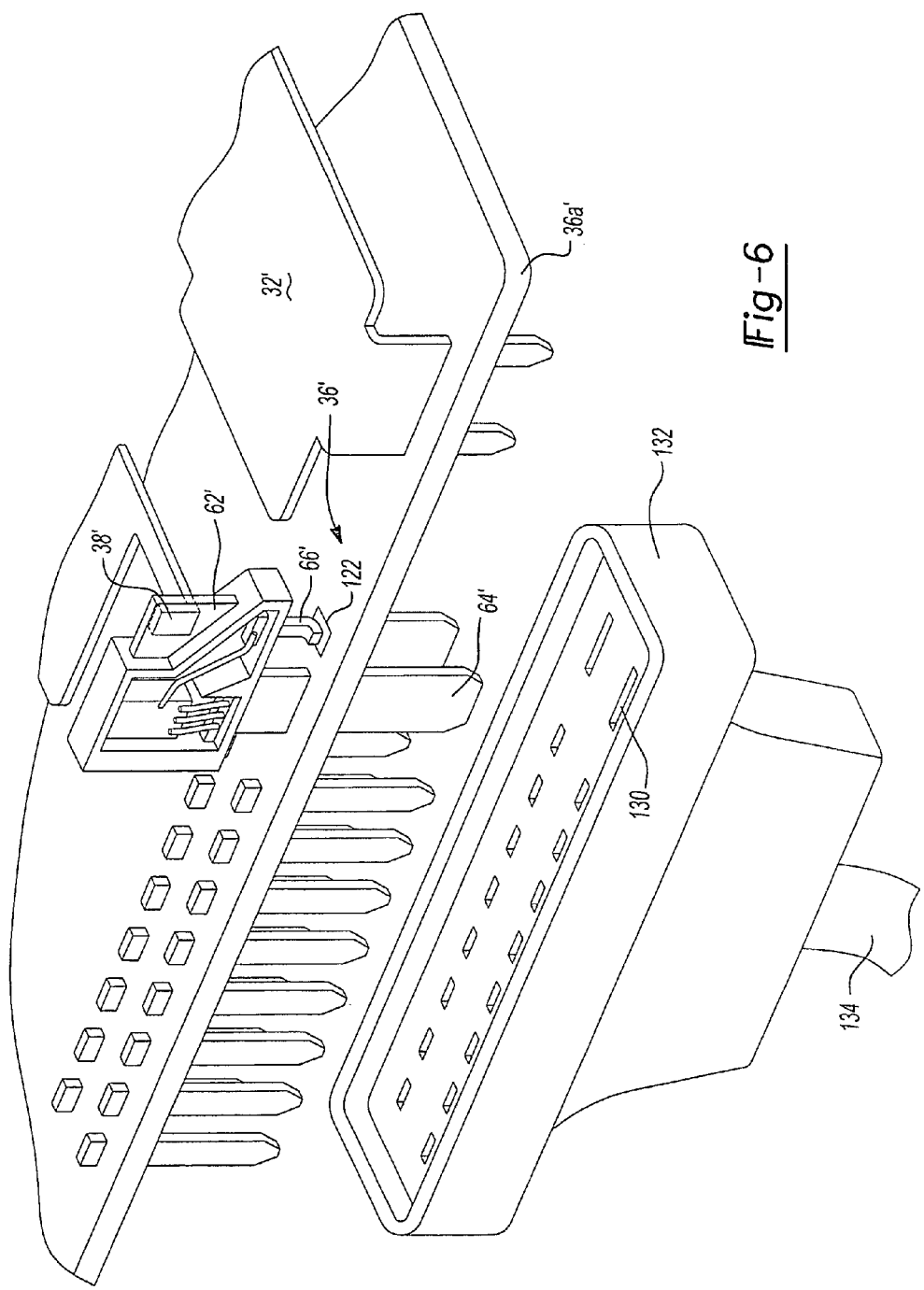
FIG. 6 is an exploded perspective view of a portion of a vehicle with a second automotive power control center constructed in accordance with the teachings of the present disclosure.
Figure 7:
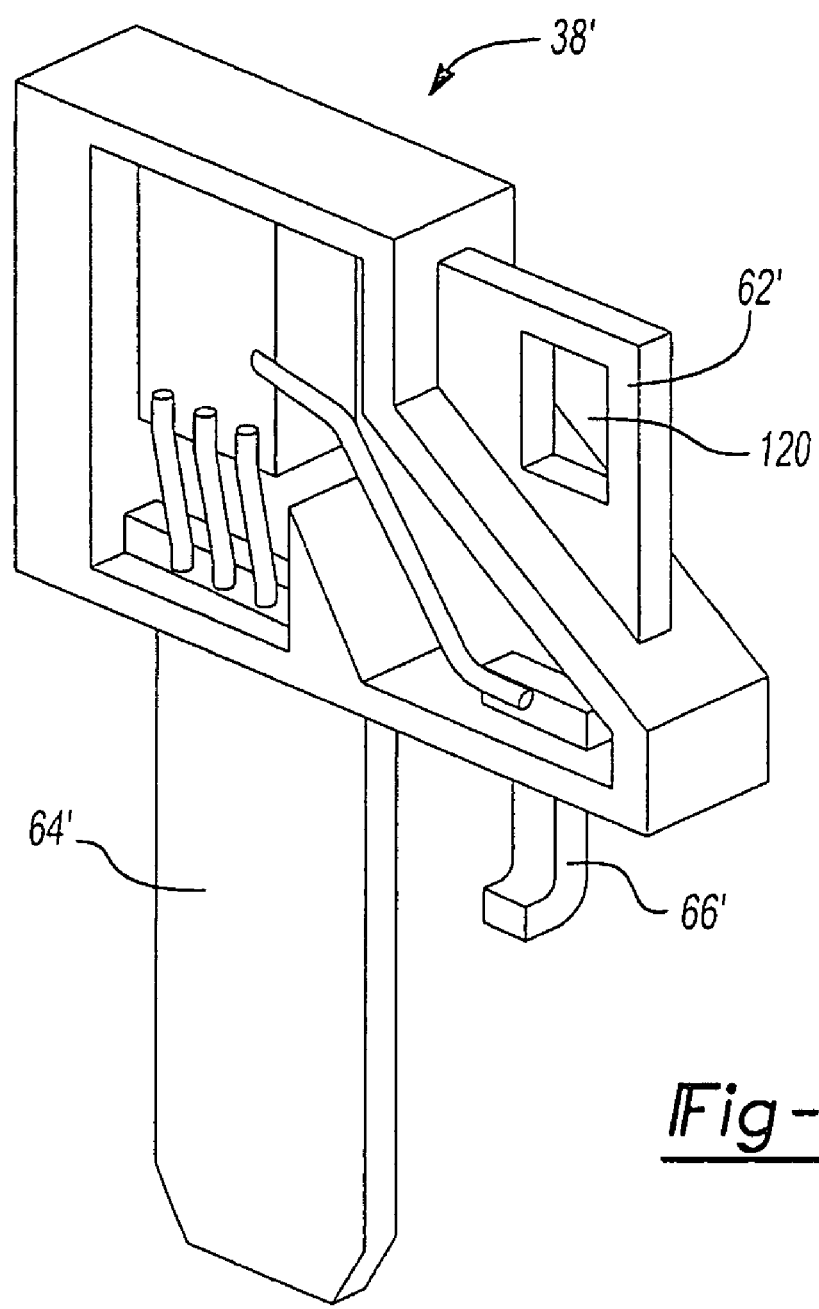
FIG. 7 is a perspective view of a portion of the automotive power control center of FIG. 6 illustrating another type of solid-state device in greater detail.

While the automotive power control center 12 has been illustrated and described as employing solid-state devices 38 that are removable (e.g., serviceable), it will be appreciated that the disclosure, in its broadest aspects, may be constructed somewhat differently. For example, one or more of the legs may be permanently coupled to an associated conductor or terminal as illustrated in FIGS. 6 and 7. In this example, the first leg 62' of the solid-state device 38' is fixedly coupled to a first conductor 32' that is electrically coupled to the B+ terminal of the vehicle battery, while the third leg 66' is coupled to a terminal on a control circuit 36' that is contained on a printed circuit board 36a'. The first leg 62' may include an aperture 120 into which the first conductor 32' is received and one or both of the first leg 62' and the first conductor 32' may be deformed (e.g., twisted) to mechanically fix the two together. Alternatively or additionally, the first leg 62' and the first conductor 32' may be fixed together via another means, such as welding, soldering or an electrically conductive adhesive. The third leg 66' may be mechanically engaged to a mating terminal or may be surface mounted to a terminal 122 in the control circuit 36' as is illustrated. The second leg 64' may extend generally transverse to the first leg 62' and extend from the power control center 12' in a manner that may be directly engaged by a terminal 130 of a connector 132 of a wire harness 134.

In view of the above, those of ordinary skill in the art will appreciate that a key advantage of a solid-state device constructed in accordance with the teachings of the present disclosure (e.g., solid-state devices 38 and 38') is that the semiconductor may be coupled to one or more terminals that may connect directly to a bus bar, a wire harness terminal or other similar type of heavy gauge conductor, thereby eliminating the need for multiple layers of bus bars and/or wide and thick copper traces formed on a printed circuit board.

As noted above (e.g., in conjunction with FIG. 3), the insulator 54 (FIG. 3) can encapsulate the semiconductor 52 (FIG. 3) and/or portions of the first leg the second leg, the third leg and/or the auxiliary leg(s). It will be appreciated, however, that the insulator 54 (FIG. 3) can be employed in a structural manner to aid the solid-state device 38 (FIG. 3) in withstanding vibration and other forces that are typically encountered in an automotive power center.

Figure 8:
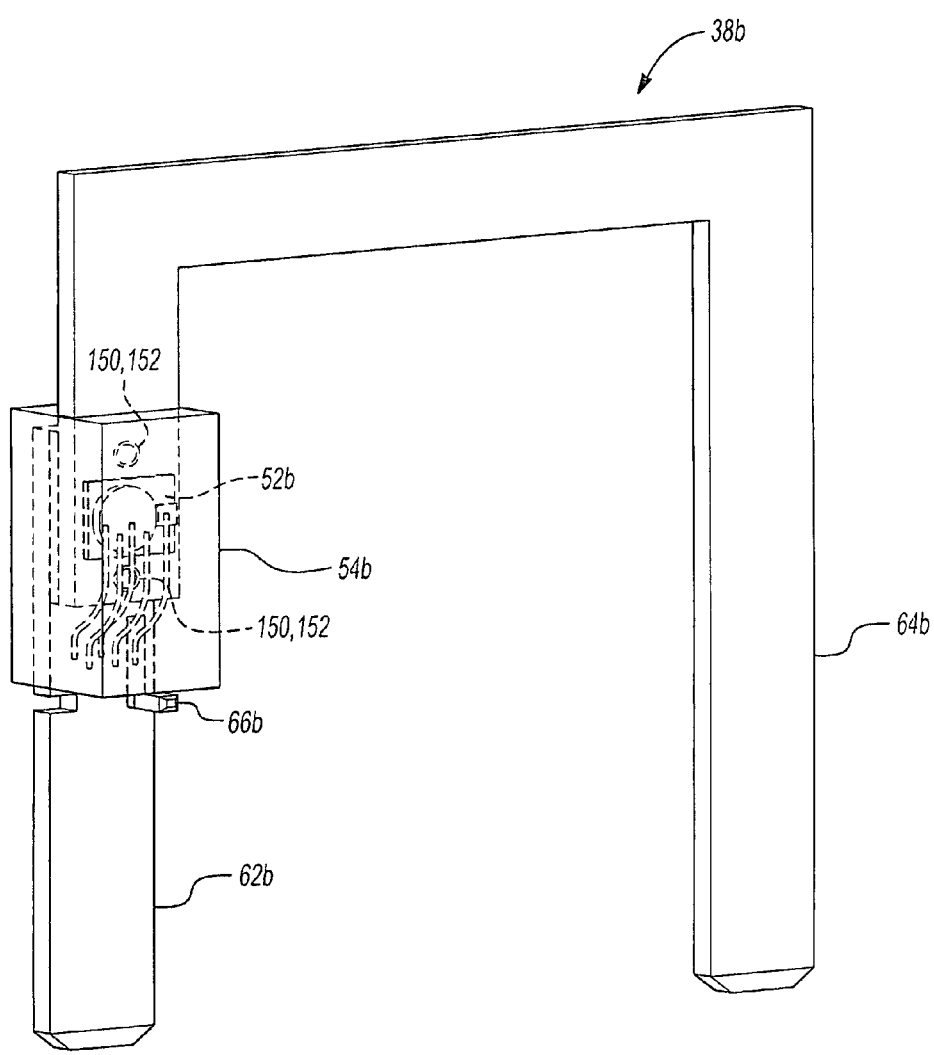
FIG. 8 is a front view of another type of solid-state device constructed in accordance with the teachings of the present disclosure.

With reference to FIGS. 8 through 10, an alternate construction of the solid state device is illustrated. The solid state device 38*b* can include a first leg 62*b*, a second leg 64*b*, a third leg 66*b* (FIG. 8), a semiconductor 52*b* and an insulator 54*b*. The first leg 62*b* can be constructed as described above (i.e., in the manner that the first leg 62 (FIG. 3) and/or the first leg 62' (FIG. 7) are constructed), except for the inclusion of a pair of first coupling apertures 150 that are disposed on opposite sides of the semiconductor 52*b*. Likewise, the second leg 66*b* can be constructed as described above (i.e., in the manner that the second leg 64 (FIG. 3) and/or the second leg 64' (FIG. 7) are constructed) except for the inclusion of a pair of second coupling apertures 152 that are located in axial alignment with the first coupling apertures 150. It will be appreciated that optional termainals 154 may be formed onto one or both of the first and second legs 62*b* and 64*b*. In the example provided, the optional terminals 154 are formed when the first leg 62*b* is blanked and are thereafter bent so as to extend in a direction that is generally perpendicular to the remainder of the first leg 62*b*.

The first and second legs 62*b* and 64*b* can be coupled to one another via a suitable means, such as an insulative compound 156. The third leg 66*b* can be an L-shaped member that can be coupled to the first leg 62*b* in an appropriate manner, such as an insulative compound 156.

The semiconductor 52*b* can be generally similar to the semiconductor 52 (FIG. 3) discussed above and can include an input terminal 72*b*, an output terminal 74*b* and a control terminal 76*b*. The semiconductor 52*b* can be coupled to the first, second and third legs 62*b*, 64*b* and 66*b* in a manner that is similar to that which is described above. In the particular example provided, the semiconductor 52*b* is adhesively coupled to the second leg 64*b* via a conductive adhesive such that the output terminal 74*b* is electrically coupled to the second leg 64*b*, a plurality of wires 158 are adhesively coupled to the input terminal 72*b* and the first leg 62*b* via a conductive adhesive 160 to thereby electrically the input terminal 72*b* and the first leg 62*b*, and one or more wires 162 are adhesively coupled to the control terminal 76*b* and the third leg 66*b* via wire bond or conductive adhesive to thereby electrically the control terminal 76*b* and the third leg 66*b*. It will be appreciated that other means for electrically coupling and insulatively coupling may be employed.

The insulator 54*b*, which is formed of an electrically insulating material such as package compound, can be formed (e.g., overmolded) onto the semiconductor 52*b*, the first leg 62*b* and the second leg 64*b*. The molten insulative material can flow between the first and second coupling apertures 150 and 152 to form fasteners (e.g., rivets) upon cooling that aid in securing the first and second legs 62*b* and 64*b* to one another for thereby stiffen and/or strengthen the structure of the solid state device 38*b*. As will be appreciated from this disclosure, the size and shape of the first and second coupling apertures 150 and 152 can be configured as desired so as to form a fastener with a desired geometry. In this regard, it will be appreciated that the first and second coupling apertures 150 and 152 need not be circular in shape but rather can be shaped in any appropriate manner.

Figure 11:
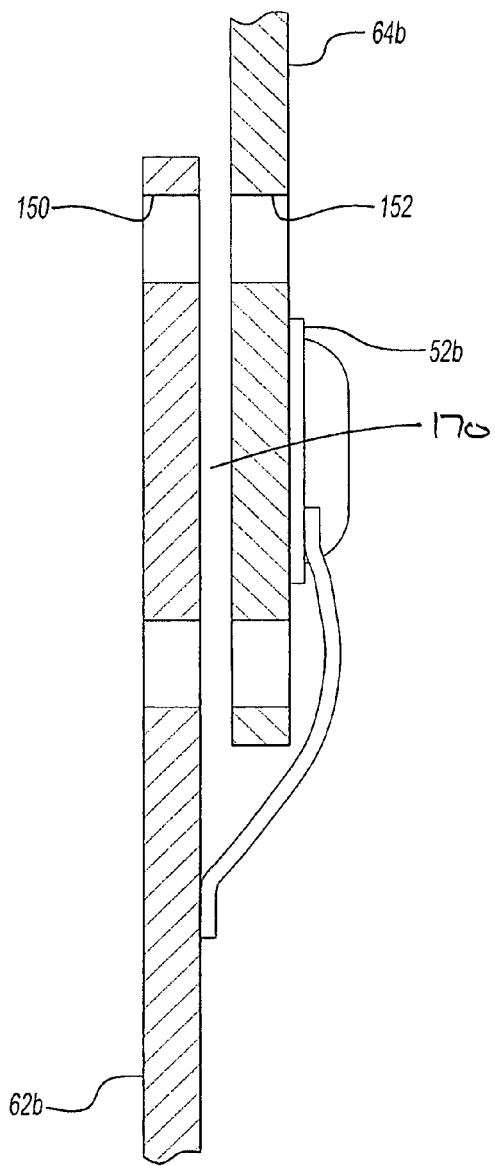
FIG. 11 is a partial longitudinal section view of a further type of solid-state device constructed in accordance with the teachings of the present disclosure prior to the formation of the insulator.
Figure 12:
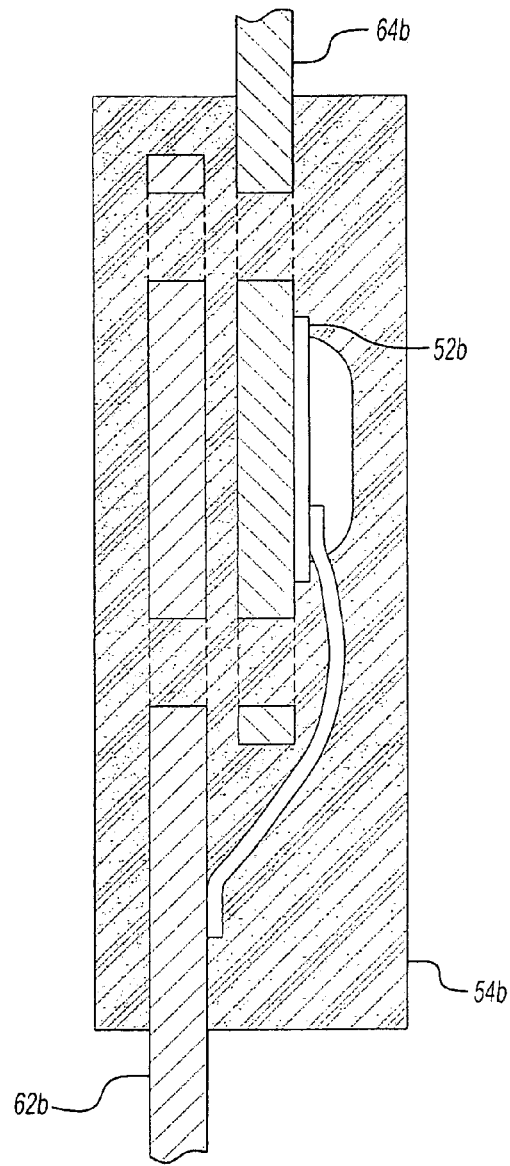
FIG. 12 is a section view similar to that of FIG. 11 but taken after the formation of the insulator.

It will be appreciated that the first and second legs 62*b* and 64*b* need not be coupled to one another (e.g., via an insulating adhesive) prior to the forming of the insulator 54*b*. In this regard, the first and second legs 62*b* and 64*b* can be spaced apart from one another to form a void space 170 therebetween as shown in FIG. 11. With additional reference to FIG. 12, molten insulative material can flow into the void space 170 as well as through the first and second coupling apertures 150 and 152 when the insulator 54*b* is formed.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A solid-state device comprising:
    a first leg adapted to be coupled to an electrical power source, the first leg being sized to carry an electrical load of at least 0.5 amp, the first leg having a section with a first surface and an opposite, second surface, the section including through-holes;
    a semiconductor electrically connected to the first surface of the section of the first leg;
    a second leg adapted to be coupled to a load, the second leg being sized to carry an electrical load of at least 0.5 amp, the second leg having a portion overlapping the second surface of the section of the first leg, the overlapping portion of the second leg being separated from the second surface of the section of the first leg by a layer of electrically insulating material, the overlapping portion of the second leg having through-holes aligned with the through-holes of the section of the first leg;
    a third leg mounted on the second leg, the third leg being electrically insulated from the second leg and adapted to be connected to a control circuit;
    means for electrically coupling the semiconductor with the second leg and with the third leg such that the semiconductor selectively controls power transmission from the first leg to the second leg in response to control signals from the third leg; and
    an electrically insulating packaging material encapsulating the semiconductor, the section of the first leg and the overlapping portion of the second leg, some of the packaging material filling the aligned through-holes.

2. The solid-state device of claim 1, wherein the semiconductor includes at least one semiconductor die.

3. The solid-state device of claim 1, wherein the layer of electrically insulating material between the overlapping portion of the second leg and the second surface of the first leg section is an insulative compound.

4. The solid-state device of claim 1, wherein the first leg is sized to carry an electrical load of at least 1.0 amp.

5. The solid-state device of claim 4, wherein the second leg is sized to carry an electrical load of at least 1.0 amp.

6. A method comprising:
providing a first leg that is formed of an electrically conductive material, the first leg being sized to carry an electrical load of at least 0.5 amp, the first leg including a mounting portion and a first securing portion, the first securing portion having a first zone adjacent the mounting portion that defines a first coupling aperture;
providing a second leg that is formed of an electrically conductive material, the second leg being sized to carry an electrical load of at least 0.5 amp, the second leg having a second securing portion with a second zone that defines a second coupling aperture;
providing a third leg that is at least partially formed of a conductive material, the third leg being coupled to the first leg, the second leg or both the first and second legs such that the third leg is fixedly coupled thereto but electrically insulated therefrom;
providing a semiconductor with an input terminal, an output terminal and a control terminal; and
electrically coupling the semiconductor to the first, second and third legs such that the input terminal is electrically coupled to the first leg, the output terminal is electrically coupled to the second leg and the control terminal is electrically coupled to the third leg;
at least partially encapsulating the semiconductor and the first and second securing portions in an electrically insulating material such that the electrically insulating material extends through the first and second coupling apertures.

7. The method of claim 6, wherein prior to at least partially encapsulating the semiconductor and the first and second securing portions in the electrically insulating material, the method includes aligning the first and second securing portions to one another such that the first coupling aperture is disposed in-line with the second coupling aperture.

8. The method of claim 7, wherein the first and second securing portions are spaced apart from one another and the electrically insulating material is received therebetween when the semiconductor and the first and second securing portions are at least partially encapsulated in the electrically insulating material.

9. The method of claim 6, wherein prior to electrically coupling the semiconductor to the first, second and third legs, the method includes positioning an electrical insulator between the first and second securing portions.

10. The method of claim 9, wherein the electrical insulator is an insulating compound.

11. The method of claim 6, wherein electrically coupling the input terminal to the first leg includes bonding an electric conductor to both the input terminal and the first leg with at least one of a wire bond and a conductive adhesive.

12. The method of claim 6, wherein electrically coupling the output terminal to the second leg includes bonding the output terminal to the second leg with at least one of a wire bond and a conductive adhesive.

13. The method of claim 6, wherein electrically coupling the control terminal to the third leg includes bonding an electric conductor to both the control terminal and the third leg with at least one of a wire bond and a conductive adhesive.

14. An apparatus comprising:
a first leg that is formed of an electrically conductive material and sized to carry an electrical load of at least 0.5 amp, the first leg including a mounting portion and a first securing portion, the first securing portion having a first, zone adjacent the mounting portion that defines a first coupling aperture;
a second leg that is formed of an electrically conductive material and sized to carry an electrical load of at least 0.5 amp, the second leg having a second securing portion with a second zone that defines a second coupling aperture;
a third leg that is at least partially formed of a conductive material, the third leg being coupled to the first leg, the second leg or both the first and second legs such that the third leg is fixedly coupled thereto but electrically insulated therefrom;
a semiconductor with an input terminal, an output terminal and a control terminal, the input terminal being electrically coupled to the first leg, the output terminal being electrically coupled to the second leg and the control terminal being electrically coupled to the third leg; and
an electrically insulative material at least partially encapsulating the semiconductor and the first and second securing portions, the electrically insulating material extending through the first and second coupling apertures.

15. The apparatus of claim 14, wherein the first and second securing portions are spaced apart from one another and the electrically insulating material is disposed therebetween.

16. The apparatus of claim 14, wherein an electrically insulating compound is disposed between the first and second securing portions.

17. The apparatus of claim 14, wherein the input terminal is bonded to the first leg with a conductive adhesive.

18. The apparatus of claim 14, wherein the output terminal is bonded to the second leg with a conductive adhesive.

19. The apparatus of claim 14, wherein the control terminal is bonded to the third leg with a conductive compound.

* * * * *